United States Patent [19]

Mastin et al.

[11] Patent Number: 5,450,369
[45] Date of Patent: Sep. 12, 1995

[54] TELEMETRY TRANSMISSION PROTOCOL FOR TOWED HYDROPHONE STREAMER

[75] Inventors: Robert H. Mastin, Dallas; Deane D. Fletcher, Plano; John S. Hepp, Irving, all of Tex.

[73] Assignee: Whitehall Corporation, Dallas, Tex.

[21] Appl. No.: 304,605

[22] Filed: Sep. 12, 1994

Related U.S. Application Data

[63] Continuation of Ser. No. 125,562, Sep. 23, 1993, abandoned.

[51] Int. Cl.$^6$ .................... G01V 1/38; G08C 15/00
[52] U.S. Cl. .................... 367/21; 367/15; 367/60; 364/421
[58] Field of Search ............ 367/15, 21, 25, 55, 367/60, 76; 364/421

[56] References Cited

U.S. PATENT DOCUMENTS

| | | | |
|---|---|---|---|
| 2,614,143 | 10/1952 | Williams | 327/171 |
| 2,708,742 | 5/1955 | Harris | 340/7 |
| 2,782,059 | 2/1957 | Stranberg | 285/247 |
| 2,900,536 | 8/1959 | Palo | 310/9.6 |
| 3,177,016 | 4/1965 | Holmgren | 285/247 |
| 3,258,739 | 6/1966 | Hurley | 340/10 |
| 3,333,236 | 7/1967 | Schloss | 340/8 |
| 3,418,624 | 12/1968 | Massa | 340/9 |
| 3,652,836 | 3/1972 | Richardson et al. | 73/178 |
| 3,739,326 | 6/1973 | Kerr et al. | 340/7 |
| 3,764,848 | 10/1973 | Berlincourt | 315/55 |
| 3,996,553 | 12/1976 | Siems et al. | 340/15 |
| 4,012,649 | 3/1977 | Cook et al. | 310/8.3 |
| 4,042,906 | 8/1977 | Ezell | 367/60 |
| 4,086,504 | 4/1978 | Ezell et al. | 367/60 |
| 4,092,629 | 5/1978 | Siems et al. | 340/15 |
| 4,160,229 | 7/1979 | McGough | 340/7 |
| 4,204,188 | 5/1980 | Weichart et al. | 367/154 |
| 4,398,272 | 8/1983 | Sifert | 367/33 |
| 4,437,689 | 3/1984 | Goebel et al. | 285/246 |
| 4,491,939 | 1/1985 | Carpenter | 367/20 |
| 4,531,204 | 7/1985 | Vanderscheb | 367/25 |
| 4,733,379 | 3/1988 | Lapetina et al. | 367/20 |
| 4,736,969 | 4/1988 | Fouts | 285/247 |
| 4,782,470 | 11/1988 | Poturnicki et al. | 367/157 |
| 4,787,069 | 11/1988 | Beauducel et al. | 367/21 |
| 4,819,216 | 4/1989 | Fraioli | 367/154 |
| 4,901,287 | 2/1990 | Hathaway et al. | 367/3 |
| 4,951,265 | 8/1990 | Buckles | 367/18 |
| 5,008,581 | 4/1991 | Kumada et al. | 310/323 |
| 5,051,962 | 9/1991 | Eaton | 367/33 |

FOREIGN PATENT DOCUMENTS

| | | |
|---|---|---|
| 2137750 | 10/1984 | United Kingdom . |
| 2145226 | 3/1985 | United Kingdom . |
| 2148501 | 5/1985 | United Kingdom . |

OTHER PUBLICATIONS

Proffitt, Jack M. "A History of Innovation in Marine Seismic Data Acquisition", *Geophysics: The Leading Edge of Exploration*, p. 24 (Mar. 1991).

*Primary Examiner*—Nelson Moskowitz
*Attorney, Agent, or Firm*—Hitt Chwang & Gaines

[57] ABSTRACT

Disclosed is a protocol for transmitting data in a towed hydrophone streamer, including a transmission method and a data frame. The method comprises the steps of (1) receiving a portion of the data frame into a data transmission circuit within a particular module of the streamer, the portion of the data frame representing telemetry data derived from an adjacent module, the transmission circuit transmitting the portion of the data frame to a desired destination, (2) receiving an end-of-data signal into the transmission circuit, the end-of-data signal commanding the transmission circuit to add telemetry data derived from the particular module to the portion of the data frame and (3) adding the data derived from the particular module to the portion of the data frame, the data frame thereby transmitted to the destination and including the data derived from the particular module, the telemetry data ordered within the frame as a function of an order of modules within the streamer.

17 Claims, 4 Drawing Sheets

TELEMETRY TRANSMISSION PROTOCOL FOR TOWED HYDROPHONE STREAMER

This is a continuation of application Ser. No. 08/125,562, filed Sep. 23, 1993, now abandoned.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

TECHNICAL FIELD OF THE INVENTION

The present invention is directed, in general, to collection and transmission of data within towed acoustic arrays used in geophysical exploration and, more specifically, to a protocol for transmitting telemetry data within an array that does not require buffering of data in each module.

BACKGROUND OF THE INVENTION

It is now common practice to explore the oceans of the earth for deposits of oil, gas and other valuable minerals by seismic techniques in which an exploration vessel imparts an acoustic wave into the water, typically by use of a compressed air "gun." The acoustic wave travels downwardly into the sea bed and is reflected at the interfaces between layers of materials having varying acoustic impedances. The wave travels back upwardly where it is detected by underwater microphone or "hydrophone" sensors in a streamer towed by the vessel to yield information regarding characteristics of the underwater material and structures.

A towed streamer comprises a plurality of pressure-sensitive hydrophone sensors enclosed within a waterproof jacket and electrically coupled to recording equipment onboard the vessel. Each hydrophone sensor within the streamer is designed to convert pressure variations surrounding the hydrophone sensor into electrical signals. Due to its extreme length (on the order of miles), the streamer is often divided into a number of separate sections or "modules" that can be decoupled from one another and that are individually waterproof. Individual streamers can be towed in parallel through the use of paravanes to create a two dimensional array of hydrophone sensors. Data buses (sometimes consisting of twisted-pair wire) running through each of the modules in the streamer carry the signals from the hydrophone sensors to the recording equipment (so-called "acoustic data").

In addition to acoustic data, it is also important to collect and transmit data concerning operational status of the array to the vessel (so-called "nonacoustic data"). Nonacoustic data comprises physical characteristics of interest regarding the operation of each module, including whether water has invaded a module in the streamer, module temperature, module depth and power supply voltage.

Today, many towed arrays have digital data channels. With digital data transmission, data transmission rates are higher and, with proper attention to electromagnetic interference, data fidelity is maintained from the hydrophone to the recording equipment.

For instance, U.S. Pat. No. 3,996,553, that issued on Dec. 7, 1976 is directed to a plurality of data acquisition units connected to a central signal processor through a common digital telemeter link. The telemeter link includes a data channel, an interrogation channel and a control channel. The central signal processor sends an interrogation signal through the interrogation channel to the data acquisition units. As each data acquisition unit recognizes the interrogation signal, it transmits its acquired data back up to the central processor through the data channel. Any selected data acquisition unit, when it receives a control signal through the control channel at the same time that it receives an interrogation signal through the interrogation channel, can be caused to perform a function different from all other units. The signal propagation velocity through the control channel is different from the signal propagation velocity through the interrogation channel. One of the two signals may be transmitted through the faster channel at a selected time later than the other of the two signals is transmitted through the slower channel. The selected time difference between the transmission of the two signals is proportional to the ratio of signal propagation delay difference between channels. Accordingly, the signal propagating through the faster channel will overtake and intercept the signal propagating through the slower channel at the selected data acquisition unit. Each data acquisition unit may have one or more input channels. Each input channel is connected in turn to the data channel through a stepping switch or multiplexer. The interrogation signal may exist in one of two or more states. In the first state, the interrogation signal resets the multiplexer, in the second state, the interrogation signal advances the multiplexer to the next input channel in sequence. Thus, this system allows for control signals to command changes of state within the individual multiplexers in the system.

In the aforementioned system, the central processor is in charge of polling the various multiplexers in turn. Thus, a relatively elaborate scheme employing dual buses each having a different propagation velocity was devised to poll the multiplexers. Such dual buses are heavier and are unreliable, due to the tendency of their propagation velocity to shift over time.

What is needed in the art is a protocol for transmitting telemetry data to recording equipment on a seismic exploration vehicle that minimizes the amount and power consumption of circuitry within the streamer, but still provides adequate bandwidth for transmitting acoustic and nonacoustic data generated along an entire length of the streamer. The protocol should also be flexible as to the length of and, hence, the amount of data generated in the streamer.

SUMMARY OF THE INVENTION

Accordingly, to address the above-discussed deficiencies of the prior art, it is a primary object of the present invention to provide a protocol for transmitting telemetry data in a towed hydrophone streamer that provides sufficient and flexible bandwidth for the data while minimizing hardware requirements and concomitant power dissipation.

In the attainment of the primary object, the present invention provides a protocol for transmitting data in a towed hydrophone streamer. The protocol dictates both a transmission method and a standard data frame for transmitting the data. The method comprises the steps of (1) receiving a portion of the data frame into a data transmission circuit within a particular module of the streamer, the portion of the data frame representing telemetry data derived from an adjacent module, the transmission circuit transmitting the portion of the data frame to a desired destination, (2) receiving an end-of-data signal into the transmission circuit, the end-of-data signal commanding the transmission circuit to add telemetry data derived from the particular module to the portion of the data frame and (3) adding the data derived from the particular module to the portion of the data frame, the data frame thereby transmitted to the destination and including the data derived from the particular module, the telemetry data ordered within the frame as a function of an order of modules within the streamer.

The data frame itself comprises a first telemetry data segment and a second telemetry data segment, the first segment temporally preceding the second segment, the first segment adapted to receive first telemetry data from an aftmost functioning transmission circuit in the streamer, the second segment adapted to receive second telemetry data from a transmission circuit in the streamer forward of the aftmost functioning transmission circuit. Each of the first and second segments comprises a first channel subsegment and a second channel subsegment, the first subsegment temporally preceding the second subsegment, the first subsegment adapted to receive near channel telemetry data from a particular transmission circuit, the second subsegment adapted to receive far channel telemetry data from another transmission circuit.

The above design yields two significant advantages. First, each module need not be programmed with its relative position in the streamer. Its position in the streamer is intrinsic and is a function of the position the module's data occupies in the data frame. Second, since the modules need not be programmed with such position information, they are completely interchangeable, adapting to their new position automatically and removing a requirement to configure the modules onboard the vessel.

In a preferred embodiment, the transmission circuit receives the data derived from the particular module from a receiver circuit coupled to the transmission circuit. The receiver circuit can be a buffer suitable for storing local data derived in an asynchronous manner, such that the data can be held ready for synchronous insertion or addition into the frame as it passes through the module.

In a preferred embodiment, the frame is initially generated at an aft end of the streamer. Therefore, the "adjacent module" is aft of the "particular module." The transmission circuit in the aftmost module places telemetry data from the aftmost module (so-called "local data") in the frontmost segment of the frame; the frame is transmitted forward to the next module. Also transmitted in synchronicity with the frame is an end-of-data signal employed to govern addition of data into the frame. In the next module, another transmission circuit receives and retransmits the frame, leaving the data from the aftmost module in the frontmost segment (thus eliminating a need to buffer the data). Upon arrival of the end-of-data signal, the other transmission circuit adds its local telemetry data as a segment following the frontmost segment.

This process continues, whereby data from each more-forward successive module are added behind the last, such that when the frame finally reaches recording equipment on the towing vehicle, the frame is complete. It should be understood that, while the frame may contain empty segments, it contains all of the data from the streamer and is complete.

In a preferred embodiment, the data frame is alternatively capable of carrying data concerning A/D status. This provides for a diagnostic mode for the streamer. Also, in a preferred embodiment, the transmission circuit is embodied in a programmable logic array, although those skilled in the art will readily perceive equally viable alternatives.

In one embodiment to be specifically illustrated in the detailed description to follow, the data frame is transmitted over a period of 2000 clock periods and comprises forty 50 bit telemetry data segments, the segments transmitted serially such that the segments are temporally offset, each of the segments adapted to receive telemetry data from corresponding transmission circuits in the streamer. Each of the segments comprises a near channel subsegment and a far channel subsegment, the near channel subsegment temporally preceding the far channel subsegment. The near and far channel subsegments each comprise: (1) a leading sign bit, (2) 23 telemetry data bits following the sign bit and (3) a trailing parity bit. An interframe gap of 48 bits temporally follows the frame to separate the frames from one another and to yield a total length from frame-start to frame-start of 2048 bits.

Finally, although the frame can validly be only one bit wide, in the illustrated embodiment, the frame is 9 bits wide, 8 bits of the 9 bit width reserved for acoustic telemetry data and a 9th bit of the 9 bit width reserved for nonacoustic telemetry data.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
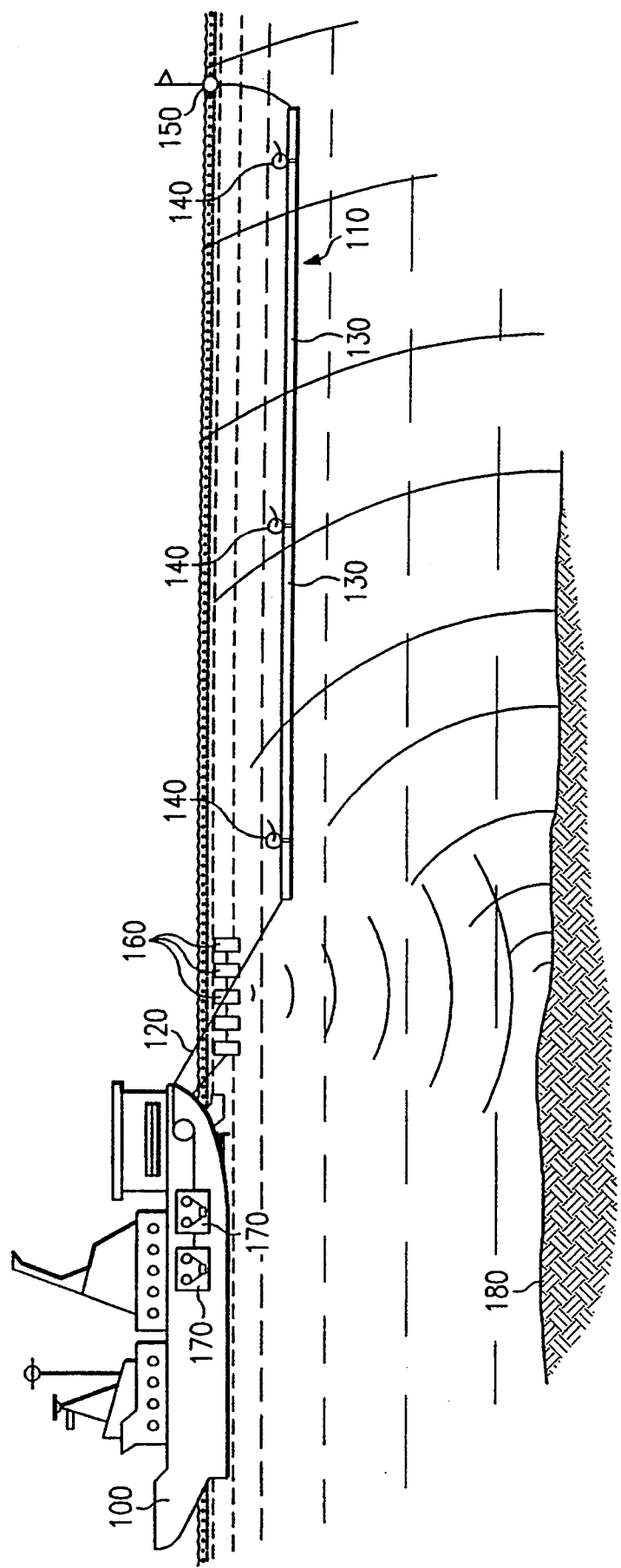
FIG. 1 illustrates an elevational view representing a towed array in operation.

Referring initially to FIG. 1, illustrated is an elevational view representing a towed array in operation. A seismic exploration vehicle 100 tows a streamer cable 110 behind it by way of a tow cable 120. The streamer 110 may comprise a rear buoy 150 if necessary. The streamer 110 is additionally provided with one or more leveling devices or "birds" 140 that serve to regulate the depth of the streamer 110 within the water. The seismic vessel also tows compressed air guns 160 or other sources of acoustic energy that generate an acoustic wave in the water that travels downwardly as shown, reflects at interfaces within a sea bed 180 and earth below the sea bed 180 and is detected by the hydrophones of the streamer 110. As well described in more detail below, the analog signals generated by the hydrophones within the streamer 110 upon receipt of the reflected wave are converted to digital format by analog-to-digital converters also comprised in the streamer 110 and are transmitted in digital form along the streamer 110 and up the tow cable 120 to be recorded by digital recording devices 170 on board the vehicle 100. The streamer 110 comprises a plurality of modules 130. Each module 130 comprises a plurality of hydrophone assemblies (individually referenced in FIG. 2). The modules 130 are connectible to each other in various numbers to make the streamer 110 any length desired, up to a practical maximum length.

Figure 2:
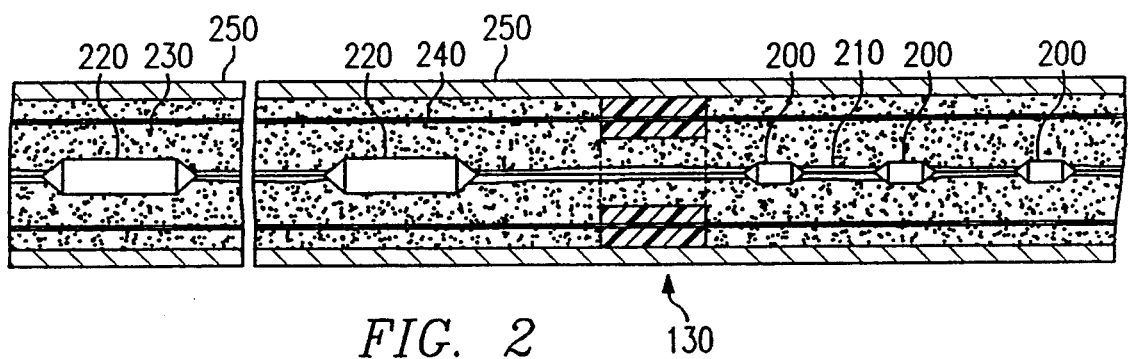
FIG. 2 illustrates a partial cross-sectional view of a typical module 130 of FIG. 1.

Turning now to FIG. 2, illustrated is a partial cross-sectional view of a typical module 130 of FIG. 1. The module 130 comprises a plurality of hydrophone assemblies 200 joined to each other by electrical cables 210. The electrical cables 210 feed into various data processing and transmission units 220 (such as the data collection and relay circuit of the present invention) spread along a length of the module 130. An open-cell foam 230 and tensioning wires 240 reside within a waterproof jacket 250. The foam 230 laterally suspends the hydrophone assemblies 200 and the units 220 therein and provides a surface suitable for longitudinally fixing the various units 220 in a relatively stable spaced-apart relationship along the length of the module 130. Maintenance of this spaced-apart relationship of the hydrophone assemblies 200 is important to proper operation of the array because the phase of signals produced by the hydrophone array in response to pressure wave impingement is a function of hydrophone spacing.

The tension cables 240 are used to carry pulling forces generated by the towing vessel and transmitted down the towed array while it is under tow, thereby relieving the cables 210, the jacket 250 and other structures within the jacket 250 from this stress. A fill fluid having a certain desired specific gravity is entrained within the open cell foam 230. This fill fluid is chosen such that, when taken as a whole, the module has a certain desired specific gravity, preferably a neutral buoyancy with respect to sea water so as to minimize effort on the part of the birds to maintain a desired array depth.

Figure 3:
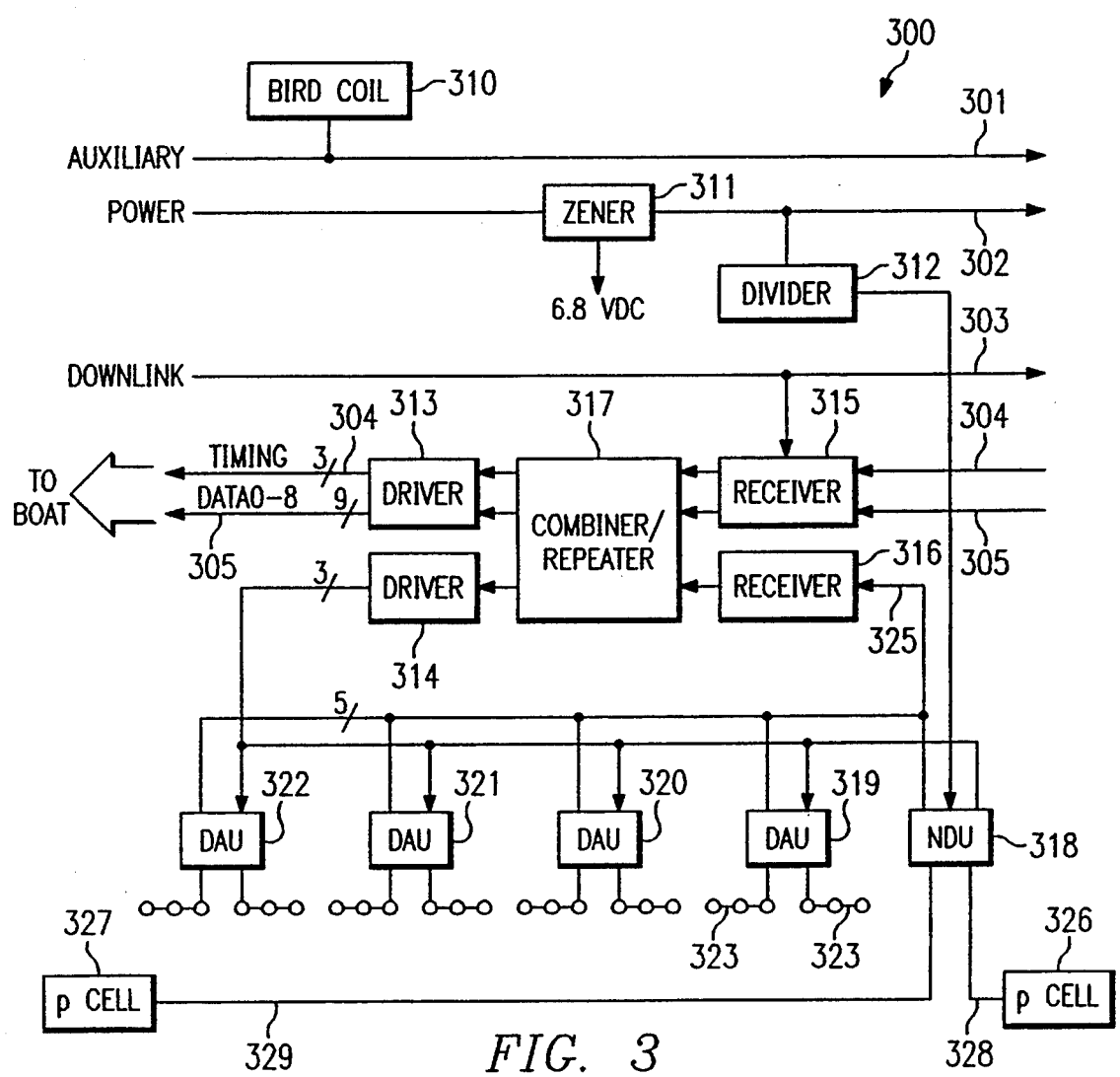
FIG. 3 illustrates a block diagram of an overall digital data system for a towed array that forms the environment for the present invention.

Turning now to FIG. 3, illustrated is a block diagram of an overall digital data system for a towed array module that forms the environment for the present invention. A digital bus 300 is, in a preferred embodiment of the present invention, comprised of twisted-pair wire.

The bus 300 is divided into an auxiliary bus 301, a power bus 302, a downlink bus 303, a timing bus 304 and a combined acoustic/nonacoustic data bus 305. The auxiliary bus 301 is used, among other things to carry signals that are inductively transmitted to one of a plurality of birds (not shown) via a bird coil 310. The power bus 302 is a constant current loop and carries relatively high voltages (on the order of several hundred volts) at the front of the streamer. A zener diode 311 removes a portion of this voltage in each of the many modules within the array to provide, in a preferred embodiment, 6.8 volts to each module. A divider 312 supplies this voltage to an input on a nonacoustic data unit ("NDU") 318 that embodies the data collection and relay circuit of the present invention. This allows the NDU 318 to detect whether the module is receiving sufficient power and to transmit an indication of the power level to the seismic exploration vehicle 100 of FIG. 1.

For purposes of the present invention, nonacoustic data is defined as all data other than data acquired through the hydrophones. This includes temperature measurements, depth measurements, voltage measurements or NDU status information. The majority of data transmitted through the streamer, however, is acoustic data.

The downlink bus 303 receives downlink commands from the seismic exploration vehicle 100, delivering the downlink commands to various components within the array. Downlink commands are used to reset or calibrate components in the streamer, among other things. A general discussion of the downlink bus is outside the scope of the present invention and is not necessary for its understanding. The timing bus 304 carries synchronizing clock signals throughout each module in the array to allow the components therein to work in concert. The data bus 305 carries both the acoustic data derived from the hydrophones within the array and the nonacoustic data derived from nonacoustic sensors coupled to the NDU 318 in the form of interleaved packets or frames. Data are arranged within the frames in an order representing the module order within the array.

The timing and data buses 304, 305 enter a receiver 315 where frames thereon (derived from aft modules) are signal-conditioned and transmitted therefrom into a telemetry data transmission circuit, called for purposes of this discussion a combiner/repeater unit ("CRU") 317, that serves to combine the data in the frames with local acoustic and nonacoustic data derived from the module shown (and buffered in a receiver 316) into revised frames. These revised frames are transmitted to the next module via a driver 313. The CRU 317 also feeds another driver 314 that serves to coordinate the operation of a plurality of acoustic data acquisition units ("DAUs") 319, 320, 321, 322 via a local timing bus 324. Each of the DAUs 319, 320, 321, 322 communicates with a plurality of hydrophones, representationally referenced as hydrophones 323. The output from the DAUs 319, 320, 321, 322 is fed to the receiver 316 for injection into the data stream of frames on the data bus 305 via a local data bus 325.

Also providing data to the receiver 316 is the NDU 318. The NDU 318 receives timing and downlink commands via the local timing bus 324 and supplies nonacoustic data to the receiver 316 via the local data bus 325. Again, the receiver 316 acts as a buffer for the data prior to entering the CRU 317 for injection into the main data stream. In addition to deriving local module voltage from the divider 312, the NDU 318 detects saltwater invasion via conductivity sensors ("Rho cells") 326, 327 via respective lines 328, 329.

It should be understood that a single module may have more than one of the circuits illustrated in FIG. 3. For that reason, the circuit of FIG. 3 is termed a telemetry interval. Thus a given module may have more or less than one telemetry interval; the relationship between the number of modules and the number of telemetry intervals is arbitrary, but typically an integer ratio (such as 2:1, 1:1 or 1:2). However, it is rarely advantageous to spread a telemetry interval over more than one module due to the number of wires that must then be coupled between the modules.

Figure 4:
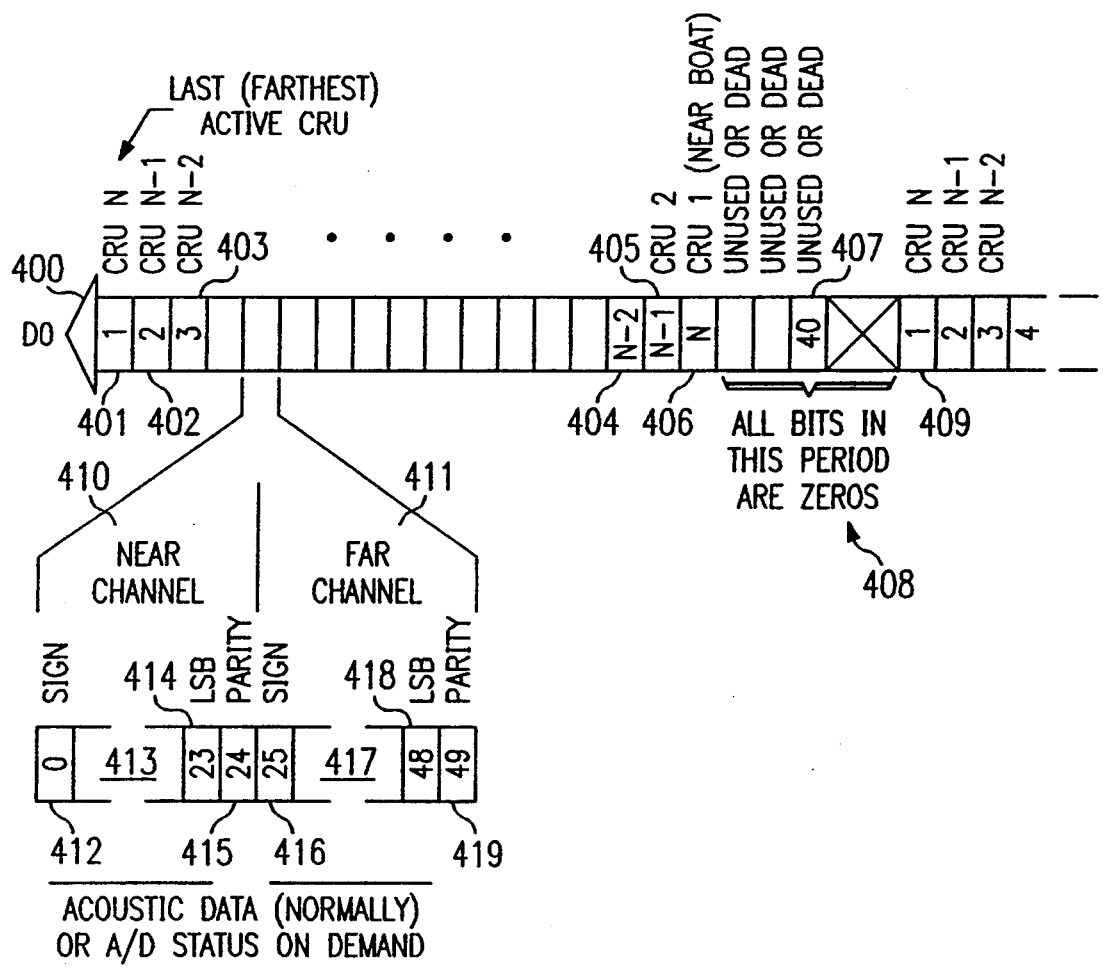
FIG. 4 illustrates a diagram of a telemetry data frame provided by the protocol of the present invention.
Figure 4:
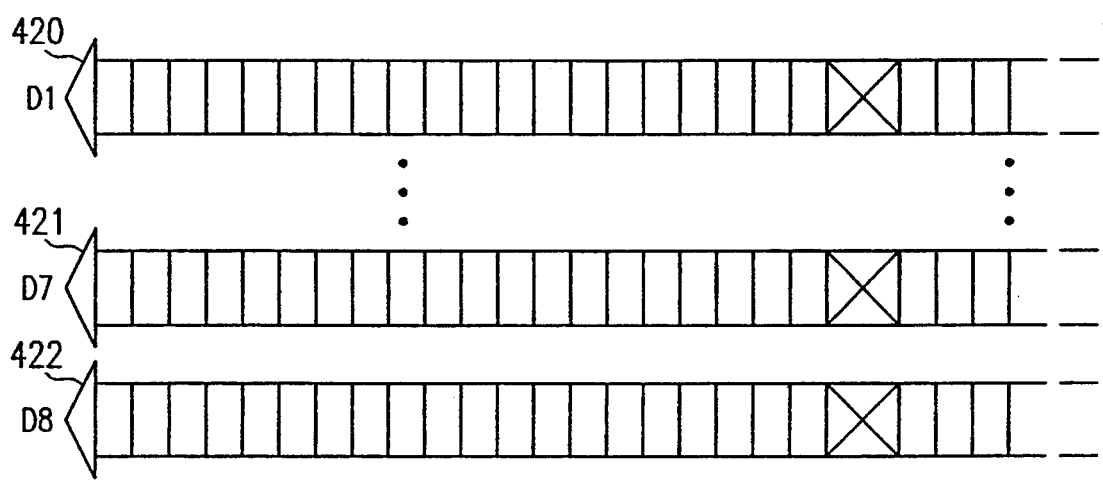

Turning now to FIG. 4 and with continuing reference to FIG. 3, illustrated is a diagram of a telemetry data frame provided by the protocol of the present invention. The circuit is embodied in the CRU 317 of FIG. 3. One component in the CRU is a controller and, in a preferred embodiment of the present invention, is a programmable gate array controller, such as the XC 3042 manufactured by the Xilinx Corporation. Attached hereto and incorporated herein by reference as Exhibit A is a source code listing of the instructions necessary to program the XC 3042 controller, via its serial erasable programmable read-only memory ("EPROM"), to operate as a CRU. Those skilled in the art can employ the source code listing to enable the present invention. Other controllers, such as microprocessor-based controllers, are also suitable for use and are within the scope of the present invention. Furthermore, the invention can be embodied in discrete digital or analog components.

A telemetry data frame according to the protocol of the present invention is represented in FIG. 4 and frame 400. Frame 400, in the illustrated embodiment, is 2000 bits long, divided into 40 segments of 50 bits per segment. A first segment 401, a second segment 402 and a third segment 403 are shown, among others. The first segment 401 corresponds to the aftmost telemetry interval (CRU, or physical module, if there is one interval per module) and is, accordingly, adapted to carry data derived from that interval (CRU) or module. The second segment 402 likewise corresponds to the next-to-the-aftmost interval. Finally, the third segment 403 corresponds to the next more forward interval.

Continuing along the frame 400, data from the third-from-the-forwardmost interval are carried in an Nth-2 segment 404, the next-to-the forwardmost interval is carried in an Nth-1 segment 405 and the forwardmost interval is carried in an Nth segment 406. Any unused segments, such as segment 407, are filled with zeroes, to complete the frame 400. An interframe gap 408 of 48 bits temporally follows the frame 400, separating the frame 400 from a subsequent frame 409 and making the combined length of the frame 400 and the gap 408 equal 2048 bits, a round number in binary systems.

As will be later described, there are frames for acoustic and nonacoustic data. The following discussion pertains to acoustic data frames. Each segment is divided into a pair of subsegments. A near channel subsegment 410 contains telemetry data from a portion of the corresponding interval that is physically nearer the towing vehicle 100 of FIG. 1. A far channel subsegment 411 likewise contains telemetry data from a portion of the corresponding interval that is farther from the vehicle 100. The near channel subsegment 410 is illustrated as being 25 bits in length (half the length of the segment as a whole). A leading sign bit 412 stores the sign of the data in the subsegment 410. Twenty-three data bits (22 of which are referenced as 413) store the actual telemetry data, with the least significant bit 414 of the data last, followed by a trailing parity bit 415 to provide a means of verifying fidelity of the data following transmission. The far channel subsegment 411 is likewise 25 bits in length. A leading sign bit 416 stores the sign of the data in the subsegment 411. Twenty-three data bits (22 of which are referenced as 417) store the actual telemetry data, with the least significant bit 418 of the data last, followed by a trailing parity bit 419 to provide a means of verifying fidelity of the data following transmission.

Nonacoustic data frames retain the segment structure as described above, but do not share the subsegment structure of the acoustic data frames. Each telemetry interval sends a status word on alternate frames. The content of the status words is crucial in determining the arrangement and condition of the streamer, though the acoustic data frame is sufficient to determine the order of the functioning modules. The status word is divided into bit fields as follows:

| | | |
|---|---|---|
| D0 | always "1" (indicates status data) | |
| D1–3 | module type (based on hydrophone group separation), mapped as follows: | |
| | 3 2 1 | |
| | 0 0 0 | no active telemetry |
| | 0 0 1 | 3.13m groups |
| | 0 1 0 | 6.25m groups |
| | 0 1 1 | 12.5m groups |
| | 1 0 0 | 25.0m groups |
| | 1 0 1 | 50.0m groups |
| | 1 1 0 | not assigned |
| | 1 1 1 | tow cable driver |
| D4–5 | saltwater leakage module, mapped as follows: | |
| | 5 4 | |
| | 0 0 | no leakage |
| | 0 1 | leakage in the module aft end |
| | 1 0 | leakage in the module forward end |
| | 1 1 | leakage in both module ends |
| D6–13 | downlink echo. The downlink control message is 8 bits, received by all telemetry intervals (not addressable) and mapped as follows: | |
| D6 | master reset | |
| | Master reset is normally a pulse that initializes all streamer telemetry components on its rising edge. It may be used in cases where telemetry intervals aft of a certain point are lost due to a temporary condition (bad telemetry signals from aft of a telemetry interval cause lockout until master reset or power up). | |
| D7–8 | sample rate, mapped as follows: | |
| | 7 8 | |
| | 0 0 | reserved |
| | 0 1 | 1.0 msec |
| | 1 0 | 2.0 msec |
| | 1 1 | reserved |
| D9 | offset calibration. Offset calibration is a pulse that initiates DC offset cancellation in 24 bit A/Ds in the streamer. | |
| D10 | calibration signal | |
| | 0 | off |
| | 1 | on |
| D11–12 | acoustic data type, mapped as follows: | |
| | 1 1 | |
| | 1 2 | |
| | 0 0 | normal acoustic data |
| | 0 1 | A/D status registers. Also causes NDU to send status only. |
| | 1 0 | all zeros in D0–D23 |
| | 1 1 | reserved |
| D13 | reserved | |
| D14–23 | reserved | |

Nonacoustic data sample formats are as follows:

| | |
|---|---|
| D0 | always "0" (indicates data sample) |
| D1-6 | sample sensor type. The nonacoustic telemetry subsamples nonacoustic sensors, alternating frames between status and sensor data. Monitoring this bit field reveals the types of nonacoustic sensors attached to each telemetry interval. Sensor types are mapped as follows:<br>6 5 4 3 2 1<br>0 0 0 0 0 0   no data<br>0 0 0 0 0 1   module voltages<br>0 0 0 0 1 0   depth (pressure)<br>0 0 0 0 1 1   heading<br>0 0 0 1 0 0   temperature<br>0 0 0 1 0 1   tension<br>0 0 0 1 1 0 - 1 1 1 1 1 1   reserved |
| D7 | nonacoustic data odd parity (generated by sensor) for D8-23 |
| D8-15 | zener voltage, unsigned |
| D16-23 | line voltage, unsigned. |

Although the frame 400 of the present invention can be of any width, the illustrated embodiment shows a width of 9 bits (D0 through D8). The first 8 bits (D0 through D7, and partially referenced as 400, 420, 421) of the 9 bit width are reserved for acoustic telemetry data (from the hydrophones) and a 9th bit (D8, and referenced as 422) of the 9 bit width is reserved for nonacoustic telemetry data (from non-hydrophone sensors coupled through the NDU 319). Those skilled in the art will readily understand that the length and width of the frame are changeable as applications demand.

Figure 5:
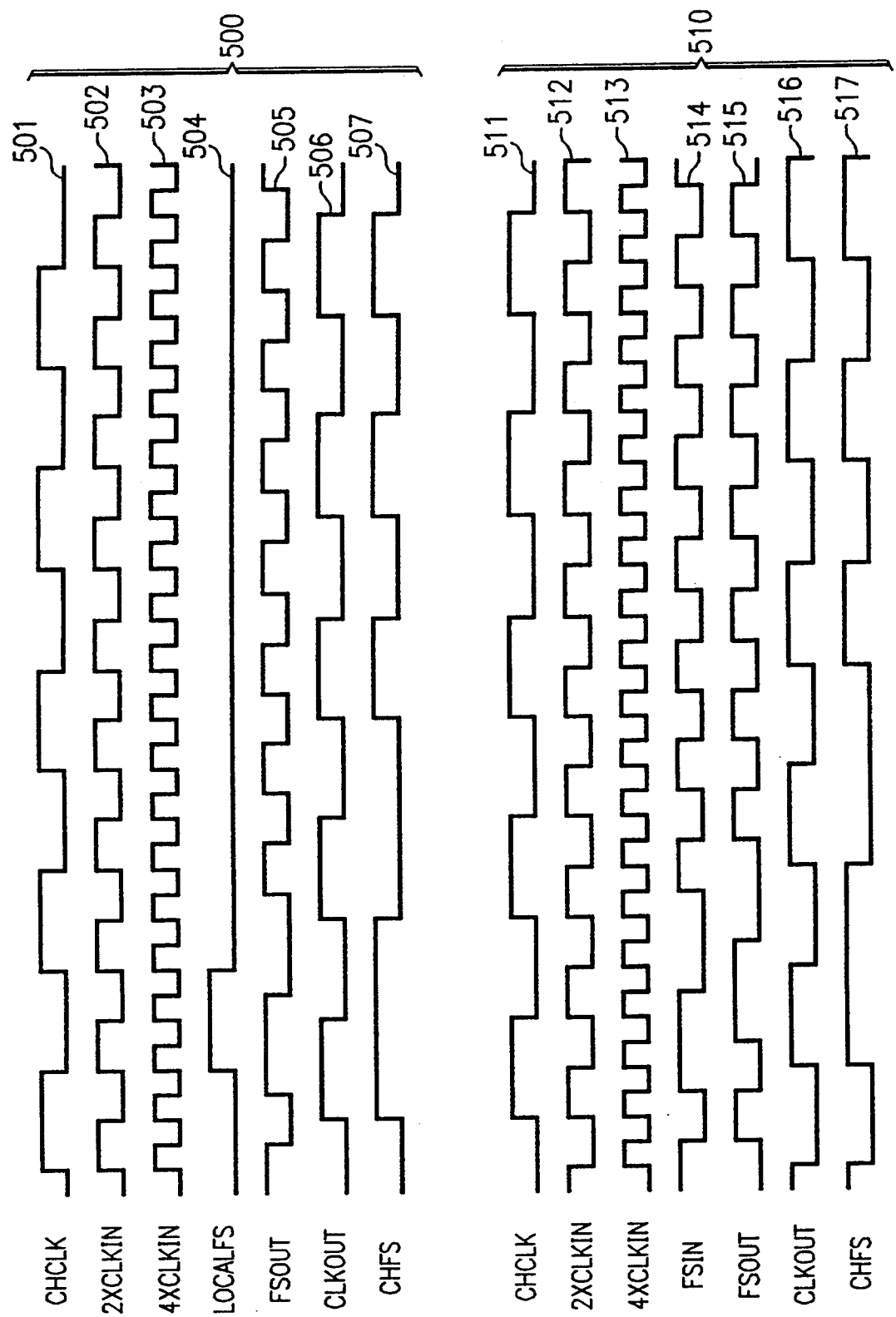
FIG. 5 illustrates a timing diagram of data synchronization signals in the illustrated embodiment of the present invention.

Turning now to FIG. 5, illustrated is a timing diagram of data synchronization signals in the illustrated embodiment of the present invention. A CRU acting as a master CRU produces a group of signals 500. A CRU slaving to the master CRU produces a group of signals 510.

A 1.024 MHz master clock signal is produced when a local clock source acting as a master clock source for an aftmost functioning CRU, internally producing a 4.096 MHz signal 503, is divided by 2 (signal 502) and again divided by 2 (signal 501). Since the CRU is not receiving a frame synchronization signal from an aft CRU, the CRU generates a local frame synchronization signal 504, a master frame synchronization signal 505, a master clock signal 506 that is phase-delayed ¼ clock cycle from the signal 501 and a channel frame synchronization signal 507.

If a CRU is slaving to a master CRU, the signals 511, 512, 513, 514, 515, 516, 517 are the same as those signals 501, 502, 503, 504, 505, 506, 507, except that they are all phase-delayed by ¼ of a clock cycle. This ¼ clock cycle delay is repeated, such that in moving from aft to fore, each CRU is delayed another ¼ clock cycle, allowing the frames to be handed from one CRU to another as the data move forward in the streamer.

As each CRU transmits the frame of data it receives and adds its local data to the frame, it transmits an end-of-data signal that prompts the next-more-forward CRU to add its data to the end of the frame. The timing of the end-of-data signal relative to the frame itself is tied to data content. Each CRU sends an end-of-data signal when it completes transmission of its added data. It should be understood, however, that there is only one end-of-data pulse per frame, the pulse shifting relative to the frame as data are added to the frame. Upon receipt of the end-of-data signal, the next-more-forward CRU knows that no more data is forthcoming and can begin its addition of data to the frame.

From the above, it is apparent that the present invention provides a protocol for transmitting data in a towed hydrophone streamer, including a transmission method and a data frame. The method comprises the steps of (1) receiving a portion of the data frame into a data transmission circuit within a particular module of the streamer, the portion of the data frame representing telemetry data derived from an adjacent module, the transmission circuit transmitting the portion of the data frame to a desired destination, (2) receiving an end-of-data signal into the transmission circuit, the end-of-data signal commanding the transmission circuit to add telemetry data derived from the particular module to the portion of the data frame and (3) adding the data derived from the particular module to the portion of the data frame, the data frame thereby transmitted to the destination and including the data derived from the particular module, the telemetry data ordered within the frame as a function of an order of modules within the streamer.

Although the present invention and its advantages have been described in detail, it should be understood that various changes, substitutions and alterations can be made herein without departing from the spirit and scope of the invention as defined by the appended claims.

What is claimed is:

1. A system for transmitting a telemetry data frame for a towed hydrophone streamer, said frame comprising a plurality of arranged signals corresponding to telemetry data and transmitted over a bus coupled to said system over a period of time, said system comprising:

an aftmost functioning transmission circuit for transmitting a first telemetry data segment signal; and a transmission circuit in said streamer forward of said aftmost functioning transmission circuit for transmitting a second telemetry data segment signal, said aftmost functioning transmission circuit transmitting said first segment signal before said forward transmission circuit transmits said second segment signal, said first segment signal adapted to receive first telemetry data from said aftmost functioning transmission circuit in said streamer, said second segment signal adapted to receive second telemetry data from said forward transmission circuit, each of said first and second segment signals each comprising:

a first channel subsegment signal and a second channel subsegment signal, said first subsegment signal temporally preceding said second subsegment signal, said first subsegment signal adapted to receive near channel telemetry data from a particular transmission circuit, said second subsegment signal adapted to receive far channel telemetry data from another transmission circuit, said transmission circuits adding telemetry data to said frame as a function of a location of said signals of said frame in said towed hydrophone streamer.

2. The system as recited in claim 1 wherein an interframe gap signal of 48 bits temporally follows said data frame.

3. The system as recited in claim 1 wherein said frame is 9 bits wide, 8 bits of said 9 bit width reserved for acoustic telemetry data and a 9th bit of said 9 bit width reserved for nonacoustic telemetry data.

4. The system as recited in claim 1 wherein an end-of-data signal issued on a timing bus prompts said transmission circuits to add said first and second telemetry data to said frame.

5. The system as recited in claim 1 wherein said data frame is alternatively capable of carrying data concerning A/D status.

6. The system as recited in claim 1 wherein said desired destination is recording equipment onboard a seismic exploration vehicle towing said streamer.

7. The system as recited in claim 1 wherein said first and second channel subsegment signals each comprise:
   a leading sign bit signal;
   23 telemetry data bit signals following said sign bit signal; and
   a trailing parity bit signal.

8. The system as recited in claim 1 wherein said transmission circuits are embodied in programmable logic arrays.

9. The system as recited in claim 1 wherein said desired destination is another transmission circuit.

10. The system as recited in claim 1 wherein said data frame comprises 40 data segment signals, each of said data segment signals adapted to store telemetry data from a selected one of said modules in said streamer.

11. A system for transmitting a telemetry data frame for a towed hydrophone streamer, said frame comprising a plurality of arranged signals corresponding to telemetry data and transmitted over a bus coupled to said system over a period of 2000 clock periods, said system comprising:
   a plurality of transmission circuits for transmitting forty 50 bit telemetry data segment signals, said transmission circuits transmitting said segment signals serially such that said segment signals are temporally offset, each of said segment signals adapted to receive telemetry data from corresponding ones of said transmission circuits in said streamer, each of said segment signals comprising:
   a near channel subsegment signal and a far channel subsegment signal, said near channel subsegment signal temporally preceding said far channel subsegment signal, said near and far channel subsegment signals each comprising:
   a leading sign bit;
   23 telemetry data bits following said sign bit; and
   a trailing parity bit, said transmission circuits adding telemetry data to said frame as a function of a location of said signals of said frame in said towed hydrophone streamer; and
   means for receiving a first telemetry data segment signal of said frame before remaining telemetry data segment signals of said frame, said first telemetry data segment signal containing telemetry data from an aftmost functioning module of said streamer.

12. The system as recited in claim 11 wherein an interframe gap of 48 bits temporally follows said frame.

13. The system as recited in claim 11 wherein said frame is 9 bits wide, 8 bits of said 9 bit width reserved for acoustic telemetry data and a 9th bit of said 9 bit width reserved for nonacoustic telemetry data.

14. The system as recited in claim 11 wherein an end-of-data signal issued on a timing bus prompts said transmission circuits to add said telemetry data to said frame.

15. The system as recited in claim 11 wherein said frame is alternatively capable of carrying data concerning A/D status.

16. The system as recited in claim 11 wherein said transmission circuits receive and retransmit said frame, adding said telemetry data to said frame during said retransmitting.

17. The system as recited in claim 11 wherein said frame is transmitted to recording equipment onboard a seismic exploration vehicle towing said streamer.

* * * * *